April 27, 1954  J. C. HOBBS  2,676,781
DOUBLE FLUID SEAL VALVE
Filed June 12, 1948

INVENTOR.
JAMES C. HOBBS
BY Richey & Watts
ATTORNEYS

Patented Apr. 27, 1954

2,676,781

UNITED STATES PATENT OFFICE 2,676,781

DOUBLE FLUID SEAL VALVE

James Clarence Hobbs, Painesville, Ohio

Application June 12, 1948, Serial No. 32,581

4 Claims. (Cl. 251—210)

This invention relates generally to fluid seals and more particularly to new seals for the ends of pipes carrying fluids under high pressure.

A great many efforts have been made heretofore to prevent the escape of fluids at the ends of pipes, as in pipe couplings, joints and the like. Some of the seals proposed were fairly satisfactory in sealing against escape of low pressure fluids while other seals were fairly satisfactory in sealing thick walled pipes against escape of fluid under fairly high pressure. Most of the prior high pressure seals were heavy, cumbersome and expensive, and few, if any, of them were capable of sealing fluid pressures on the order of 1500 pounds per square inch or more when subject to rapid temperature changes.

The present invention provides a simple, light, inexpensive seal which is capable of sealing against escape of fluids whose pressures range all the way up to 40,000 pounds per square inch or more. Such seals may be used with pipes whose thicknesses range from a very thin wall such, for example, as 0.02 inch up to heavy walls such, for example, as several inches. Furthermore, the sealing effect of seals embodying the present invention increases with increases in forces tending to separate the pipe axially from its associated member and also increases with increases in the sealing force applied to the seal. From what has just been stated it will be apparent that the present invention provides a new seal which is capable of many different applications and which is not only better in many respects than prior seals but is much more effective in operation. Furthermore, as will be pointed out more in detail hereinafter, the mode of operation of seals embodying the present invention is new and different from the modes of operation of all other prior seals with which I am familiar.

In the drawings accompanying and forming a part of this specification and showing various forms of apparatus embodying this invention.

Figure 1:
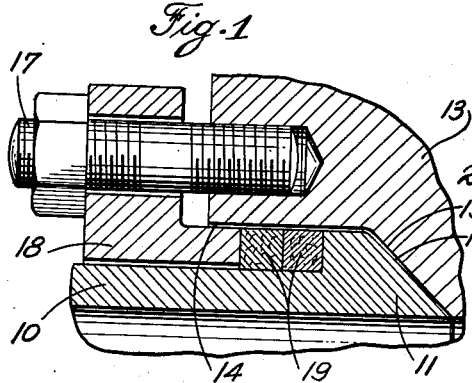
Figure 1 is a fragmentary, sectional view of a pipe formed with sealing ring end, a coupling and deformable packing.

In Fig. 1 the pipe 10 is upset or otherwise formed with exterior enlargement 11 near its end, and the end of the pipe is shaped to form an outer conical surface 12 which is inclined at an angle of about 44° to the longitudinal centerline of the pipe. This surface 12 is of substantially axial length due to the presence of the enlargement 11 on the outside of the pipe. Coupling 13 is provided with a cylindrical surface 14 and a conical surface 15 which is opposed to the conical surface 12, which is inclined at an angle for the purposes of illustration of about 45° to the longitudinal centerline of pipe 10. Coupling 13 carries studs 17 and a retaining ring 18 substantially as shown in Fig. 1. Between ring 18 and enlargement 11 of pipe 10, deformable packings 19 are interposed. These packings may be composed of any ordinary, fibrous packing material, as those skilled in the art will understand.

When pipe 10 and coupling 13 are assembled with ring 18 and packings 19 and the said ring presses the packings against the enlargement 11, the conical surfaces 12 and 15 make substantially a line sealing contact near their apices close to the end of the pipe 10. Packings 19 transmit axially exerted force from ring 18 to pipe 10 and also simultaneously radially expand inwardly and outwardly to seal the additional space between pipe 10 and coupling 13.

Figure 2:
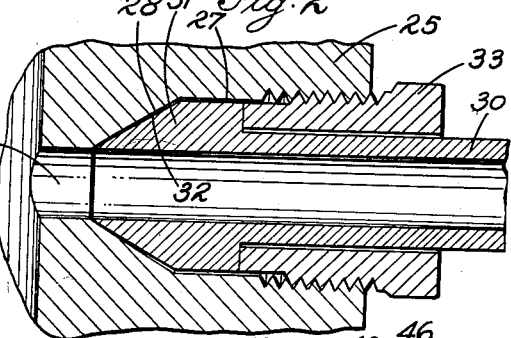
Figure 2 is a view similar to Fig. 1 but showing a modified retainer and omitting the deformable packing.

Fig. 2 shows a body 25 having extending therethrough a passage which is restricted as at 26 and enlarged as at 27. It will be understood that body 25 may be the wall of a container or the like. The walls of portions 26 and 27 of the passage through member 25 are connected by conical wall 28, which has its apex adjacent to the passage 26 and an inclination of about 45° to the longitudinal centerline of that passage. Pipe 30 extends into body 25 and has an enlarged end portion 31 with a conical surface 32 inclined at an angle of about 44° to the longitudinal centerline of passage 26. Pipe 30 is quite similar 2,676,781

3 to pipe 10 of Fig. 1. A retaining ring 33 is screw threaded into passage 27 around pipe 30 and serves to exert pressure axially upon the annular abutment wall defined by the enlarged end portion 31 of the pipe. Unlike the assembly of Fig. 1, in this case no packing is provided to furnish a secondary seal as described above. It will be understood, however, that the end portion 31 of the pipe is of flexible or resilient metal construction so that when the ring 33 exerts pressure axially on the said abutment of the pipe, conical surface 32 is pressed against conical surface 27 of body 25 and substantially a line contact is made with those surfaces close to the end of pipe 30. This contact constitutes an effective seal against fluid flow through body 25 and pipe 30, and as the pressure upon the end portion 31 is increased, either by increasing the pressure of the fluid within the pipe or by further drawing up the ring 33, this line contact is widened so that there is produced a contact between the conical surface, which is circumferentially continuous throughout an appreciable area, and is at the same time fluid tight.

Figure 3:
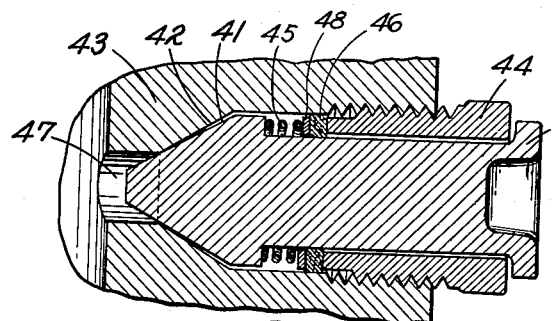
Figure 3 is a fragmentary, sectional view of a sealing plug for an aperture in a wall, showing an annular packing ring and a compression spring element.

Fig. 3 shows apparatus quite like that of Fig. 2, the major differences being that the pipe 30 is replaced by a plug 40, that packing is provided, and that spring means are provided to assure sealing of the packing means against the passage walls. Plug 40 has a conical end surface 41 inclined at an angle of about 44° to the longitudinal centerline thereof, and may be pressed into circumferentially continuous, substantially line sealing contact with conical surface 42 of member 43, that surface making up an angle of about 45° with the said centerline. When such contact is established by axial movement of the retaining ring 44, annular compression spring 45 is compressed between the packing ring 46 and the opposing annular abutment wall of plug 40, and said plug projects into passage 47 of member 43. With the parts in position, as shown in Fig. 3, sealing is thus assured at all times not only between the contact surfaces 41 and 42, but also by engagement of packing 46 with opposing wall portions of member 43. Spring 45 may preferably be of the disc or Belville type.

Figure 4:
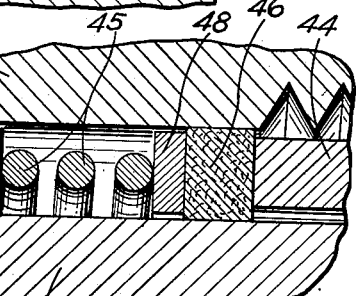
Figure 4 is an enlarged, fragmentary, sectional view of the assembly of Fig. 3, showing particularly the spring element and indicating its function.

In Fig. 4 the relative positions of the several parts of the Fig. 3 assembly, including plug 40, retaining ring 44, compression spring 45 and packing 46, are clearly indicated. It will be noted also from this drawing that a ring 48, suitably of relatively thin but rigid construction, is disposed between compression spring 45 and the annular packing 46 so that the effect of the spring will be distributed uniformly across the opposing surfaces of the packing annulus.

Figure 5:
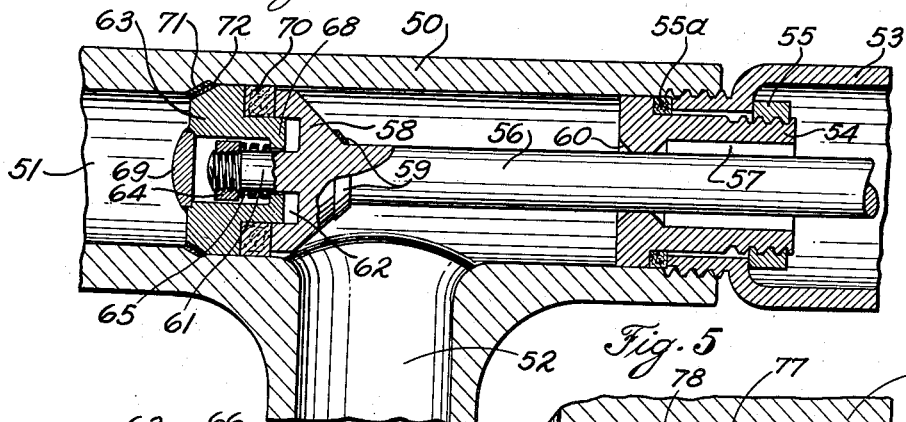
Figure 5 is a fragmentary, sectional view of a plug valve, including a sealing ring, annular compression spring, and deformable packing.

Fig. 5 shows a further variation of the present invention wherein it is applied to a valve assembly, the valve body 50 having an axial passage 51 and a transverse passage 52. In one end of the passage 51 a tube 53 is connected by a screw threaded engagement within body 50. Tube 53 carries a tubular sleeve 54 which at one end has close fitting engagement with the inner surface of body 50 and at the other end is screw threaded and fitted with ring 55 which bears against an inwardly projecting annular portion of tube 53 and which serves to move sleeve 54 axially to compress packing 55a between the inner end of the sleeve and the adjacent end of tube 53 and to deform the packing into fluid sealing engagement with the sleeve and body 50 so

4 as to prevent passage of fluid under pressure between the sleeve and body.

A valve stem 56 extends axially through sleeve 54 and packing (not shown) may occupy the space 57 around stem 56 in sleeve 55. Valve stem 56 carries an enlarged head 58 at its inner end. This head is preferably provided with a wear ring 59 near its base which seats in a correspondingly shaped recess 60 in the opposed end of sleeve 54 when the stem 56 is fully retracted and which may thereby impede or substantially prevent the flow of fluid under pressure through sleeve 54 and around stem 56.

Figure 6:
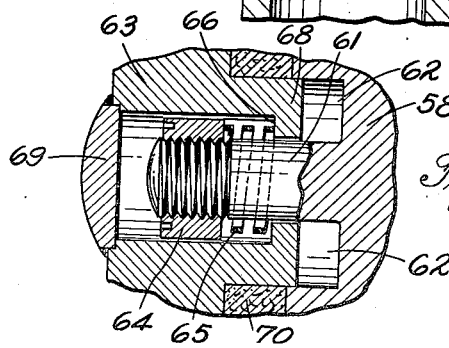
Figure 6 is an enlarged, fragmentary, sectional view of the assembly of Fig. 5, showing particularly the spring element and indicating its function.

The free end of head 58, as indicated in Fig. 5 and more clearly shown in the enlarged view of Fig. 6, has a central threaded post 61 and an annular groove 62 surrounding the post. Ring 63 is telescoped over post 61 and is held in assembled relation therewith by nut 64 and has an annular compression spring 65 disposed around the post 61 and bearing against the nut 64 and opposing annular abutment surface 66 in the ring whereby the ring and head are constantly urged toward further telescopic engagement. Ring 63 further has an annular projection 68 which extends into groove 62 and cap 69 is welded over the central opening in said ring into which post 61 projects. Cap 69 serves to prevent flow of fluid under pressure from passage 51 through ring 63 and head 62. Packing 70 between head 58 and ring 63 may be deformed into fluid sealing contact with these two members and with the surrounding surface of body 50. Preferably spring 65 is sufficiently strong in itself to cause this fluid sealing contact, but it will be understood that when the valve is closed by advancing the stem to the left in the drawing, the effect of the spring in deforming the packing is supplemented by the effect of the head 58 pressing against the ring so that even tighter contact of the packing and opposing annular area of the body is obtained. Body 50 is connected, as by welding, to a conical member 71 which is preferably composed of metal harder than that of body 50 and defines a valve seat for engagement with opposing annular portion of ring 63. In this annular portion ring 63 is provided with a similar conical portion ring 63 is provided with a similar conical member 72, and these two conical members have opposed conical surfaces which are inclined at slightly different angles to the longitudinal centerline of passage 51 so that they will initially engage near their apices and form a small included angle of, for example, approximately 1 or 2 degrees.

With further reference to Figs. 5 and 6, it will be seen that when valve stem 56 is moved toward the left, the ring 63 is moved relative to body 50 until conical members 71 and 72 form a circumferentially continuous line contact with each other, which contact is an efficient seal for fluids under pressure. At the same time, fluid sealing of the contact is realized between packing annulus 70 and the valve body primarily because of the action of spring 65 and also due in part to the force applied directly to the packing annulus through the stem. Further endwise movement deforms packing 70 into wider sealing contact with the inner surface of body 50 and may increase the area of contact between members 71 and 72. Movement of stem 56 toward the right, on the contrary, relieves the pressure on packing 70 and permits ready axial movement of ring 63. When stem 56 has been moved far enough toward the right to seat ring 59 in recess 60, fluid may flow freely in passages 51 and 52 and any tendency of such fluid to flow along stem 56 will be impeded or prevented by the engagement of packing 70, the opposed surface of body 50, and by engagement of ring 59 with sleeve 54.

Figure 7:
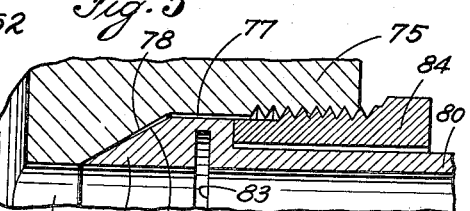
Figure 7 is a fragmentary, sectional view of a pipe formed with a resilient sealing ring end, and a coupling.

Fig. 7 shows in part an assembly which is generally similar to that of Fig. 2. In this embodiment of my invention a body 75 quite like body 25 of Fig. 2 is provided, having extending through it a passageway which is restricted as at 76 and enlarged as at 77. The walls of portions 76 and 77 of this passage are connected by conical wall 78 which has its apex adjacent to the passage 76 and is inclined at an angle of about 45° to the longitudinal centerline of that passage. A pipe 80 extends into body 75 and has an enlarged end portion 81 with a conical surface 82 inclined at an angle of about 44° to the longitudinal centerline of the passage 76. Pipe 80 is quite similar to pipe 30 of Fig. 2 but in its end portion 81 is provided with a relatively deep groove 83 in its inner wall for a purpose to be described. A retaining ring 84, screw threaded into passage 77 around pipe 80, serves to exert pressure axially on the annular abutment wall defined by end portion 81 of the pipe. It will be appreciated that due to annular groove 83 and also due in part to the fact that the extreme inner end portion of pipe 80 is of relatively thin section, portion 81 of the pipe constitutes a resilient element in the assembly which under increased internal fluid pressure will flex to increase progressively the sealing contact between pipe 80 and body 75. This, of course, presupposes initial, fluid sealing, substantially line contact which is circumferentially continuous between surfaces 78 and 82 and which may be established by drawing up retaining ring 84 to that position shown in Fig. 7. Such initial sealing contact thus is widened, i. e. increased in area, under increasing fluid pressure within the body and pipe as the end 81 or a portion thereof flexes, assuring adequate sealing contact between body 75 and pipe 80 at all times and under a wide variety of fluid pressure circumstances.

It will be understood from the foregoing description that retainer rings of the screw threaded type may be used interchangeably with those of the stud carrying type and that retainer rings other than the forms illustrated may be used as desired. It will also be understood that the angularity of the conical surfaces of each of the foregoing embodiments of the invention may vary within wide limits without decreasing the fluid sealing effect obtained in accordance with this invention. This angularity should in most instances be between about 5° and about 75° with respect to the longitudinal centerline of the plug, pipe or body, as described above, except under special conditions, and angularities between about 30° to 60° are preferable in most conditions and applications. Furthermore, it will be appreciated that the pipes of the above illustrations may be plugs and vice versa, and that the sealing and fluid pressure responsive effects will not be lost providing the structural features responsible for these effects are not eliminated. For instance, the pipe 80 may be a plug and yet serve its purpose as described, if a wall or partition is provided therein and is located in such a manner as not to interfere with or prevent flexing of the enlarged end portion 81 or part thereof.

This is a continuation-in-part of my co-pending application, Serial No. 549,533, filed August 15, 1944, and entitled "Fluid Seals," now Patent No. 2,443,187, issued June 15, 1948.

Having thus described the present invention so that those skilled in the art will be able to understand and practice the same, I state that what I desire to secure by Letters Patent is defined in what is claimed.

What is claimed is:

1. A double fluid seal comprising a valve body having a fluid passage defined in part by a substantially cylindrical surface and an adjoining substantially conical surface, a first imperforate member having a sealing surface on one end to engage said conical surface, a second imperforate member disposed adjacent to the other end of said first member, a deformable annulus between said members an engageable with said cylindrical surface, means including a spring compressed between said members for urging said members toward each other and against opposite surfaces of said annulus and thereby forming a first seal by deforming said annulus into initial, circumferentially continuous, fluid sealing contact with said cylindrical surface, and means for forming a second seal and thereby doubly sealing said passage against flow of fluid past said members, said means including an axially movable rigid member connected to said second member and serving when moved toward said conical surface to bring said sealing surface into circumferentially continuous, fluid sealing contact with said conical surface and to increase the initial contact of said deformable annulus with said cylindrical surface and to unload said spring.

2. A double fluid seal comprising a valve body having a fluid passage defined in part by a substantially cylindrical surface and an adjoining substantially conical surface, an imperforate member including a ring portion having a sealing surface on one end to engage said conical surface, a disk-like, imperforate head disposed adjacent to the other end of said member, said ring portion and head being positioned in telescoped relation, a deformable annulus between said member and head and engageable with said cylindrical surface, means including a stop connected to said head and a spring compressed between said stop and said member, for urging said member and head toward each other and against opposite surfaces of said annulus and thereby forming a first seal by deforming said annulus into initial, circumferentially continuous, fluid sealing contact with said cylindrical surface, and means for forming a second seal and thereby doubly sealing said passage against flow of fluid past said member and head, said means including an axially movable stem connected to said head and serving, when moved toward said conical surface, to bring said sealing surface into circumferentially continuous, fluid sealing contact with said conical surface and to increase the initial contact of said deformable annulus with said cylindrical surface and to unload said spring.

3. A double fluid seal comprising a valve body having a fluid passage defined in part by a substantially cylindrical surface and an adjoining substantially conical surface, an imperforate member including a ring portion having a sealing surface on one end to engage said conical surface, a disk-like imperforate head disposed adjacent to the other end of said member, said head having a recess to receive said ring and an axial post projecting into said ring, a deformable annulus surrounding said ring and engageable with said member, head and cylindrical surface, means including a nut on said post and a spring around said post and compressed between said nut and said member, for urging said member and head toward each other and against opposite surfaces of said annulus and thereby forming a first seal by deforming said annulus into initial, circumferentially continuous, fluid sealing contact with said cylindrical surface, and means for forming a second seal and thereby doubly sealing said passage against flow of fluid past said member and head, said means including an axially movable stem connected to said head and serving when moved toward said conical surface to bring said sealing surface into circumferentially continuous, fluid sealing contact with said conical surface and to increase the initial contact of said deformable annulus with said cylindrical surface and to unload said spring.

4. A double fluid seal comprising a valve body having a fluid passage defined in part by a substantially cylindrical surface and an adjoining substantially conical surface, and a lateral branch opening through said cylindrical surface remote from said conical surface, an imperforate member including a ring portion having a sealing surface on one end to engage said conical surface, a disk-like imperforate head disposed adjacent to the other end of said member, said ring portion and head being positioned in telescoped relation, a deformable annulus between said member and head and engageable with said cylindrical surface, means including a stop connected to said head and a spring compressed between said stop and said member, for urging said member and head toward each other and against opposite surfaces of said annulus and thereby forming a first seal by deforming said annulus into initial, circumferentially continuous fluid sealing contact with said cylindrical surface between said conical surface and said branch opening, and means for forming a second seal and thereby doubly sealing said passage against flow of fluid past said member and head, said means including an axially movable stem connected to said head and extending past said branch opening, said means serving when moved toward said conical surface to bring said sealing surface into circumferentially continuous, fluid sealing contact with said conical surface and to increase the initial contact of said deformable annulus with said cylindrical surface and to unload said spring.

References Cited in the file of this patent

UNITED STATES PATENTS

| Number | Name | Date |
|---|---|---|
| 75,670 | Douglas | Mar. 17, 1868 |
| 405,404 | Forestier | June 18, 1889 |
| 1,185,542 | Roberts | May 30, 1916 |
| 1,371,575 | Rousseau | Mar. 15, 1921 |
| 1,658,810 | Machtolf | Feb. 14, 1928 |
| 1,779,893 | Schmitz | Oct. 28, 1930 |
| 1,863,712 | Byfield | June 21, 1932 |
| 1,910,070 | Spaeth | May 23, 1933 |
| 1,937,204 | Olson | Nov. 28, 1933 |
| 2,283,672 | Frances | May 19, 1942 |
| 2,297,535 | Bryant | Sept. 29, 1942 |
| 2,300,030 | Zinkl | Oct. 27, 1942 |
| 2,330,864 | Bruno | Oct. 5, 1943 |
| 2,342,834 | Brant | Feb. 29, 1944 |
| 2,356,987 | Gallop | Aug. 29, 1944 |
| 2,389,118 | Buehner | Nov. 20, 1945 |

FOREIGN PATENTS

| Number | Country | Date |
|---|---|---|
| 525,241 | Great Britain | of 1940 |
| 700,958 | France | of 1931 |